United States Patent
Bastien et al.

(10) Patent No.: US 9,958,946 B2
(45) Date of Patent: May 1, 2018

(54) SWITCHING INPUT RAILS WITHOUT A RELEASE COMMAND IN A NATURAL USER INTERFACE

(71) Applicant: Microsoft Technology Licensing, LLC, Redmond, WA (US)

(72) Inventors: David William Bastien, Kirkland, WA (US); Oscar P. Kozlowski, Seattle, WA (US); Mark D. Schwesinger, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 216 days.

(21) Appl. No.: 14/298,562

(22) Filed: Jun. 6, 2014

(65) Prior Publication Data
US 2015/0355717 A1    Dec. 10, 2015

(51) Int. Cl.
G06F 3/01    (2006.01)
G06F 3/03    (2006.01)
G06K 9/00    (2006.01)

(52) U.S. Cl.
CPC ............ *G06F 3/017* (2013.01); *G06F 3/0304* (2013.01); *G06K 9/00355* (2013.01)

(58) Field of Classification Search
USPC ....... 715/863, 740, 784, 810, 245, 700, 764, 715/782, 800, 830, 848, 856, 864, 716;
(Continued)

(56) References Cited

U.S. PATENT DOCUMENTS 8,261,212 B2    9/2012 Wigdor et al.
8,525,805 B2    9/2013 Digon
(Continued)

FOREIGN PATENT DOCUMENTS

EP    1967941 A2    9/2008
EP    2450772 A2    5/2012
WO    2011098496 A1    8/2011

OTHER PUBLICATIONS

Yin, Ying, "A Hierarchical Approach to Continuous Gesture Analysis for Natural Multi-modal Interaction", In of the 14th ACM International Conference on Multimodal Interaction, Oct. 22-26, 2012, 4 pages.
(Continued)

*Primary Examiner* — Doon Chow
*Assistant Examiner* — Wendy Nicholas

(57) ABSTRACT

User input in the form of image data is received from a user via a natural user interface. A vector difference between an adjustment start position and a current position of the user input is calculated. The vector difference includes a vector position and a vector length. The vector position is compared to stored rail data, and the vector length is compared to a stored threshold length. The rail data describes a plurality of virtual rails associated with an application. Based on the comparisons, the user input is matched to one of the plurality of virtual rails and a notification describing the matching is provided to the application. The application, thereupon, transitions from a first command to a second command corresponding to the matching virtual rail without receiving any explicit termination gesture for the first command from the user.

20 Claims, 14 Drawing Sheets

(58) Field of Classification Search
USPC .................... 345/156, 419, 157, 175, 103
See application file for complete search history.

(56) References Cited

U.S. PATENT DOCUMENTS

| | | |
|---|---|---|
| 2006/0214926 A1 | 9/2006 | Kolmykov-Zotov et al. |
| 2008/0192005 A1* | 8/2008 | Elgoyhen ............... G06F 3/014 345/158 |
| 2009/0265671 A1 | 10/2009 | Sachs et al. |
| 2010/0040292 A1 | 2/2010 | Clarkson |
| 2010/0073284 A1* | 3/2010 | Dods ....................... G06F 3/017 345/156 |
| 2010/0146464 A1 | 6/2010 | Wilson et al. |
| 2010/0208945 A1 | 8/2010 | Te Vrugt et al. |
| 2010/0306710 A1 | 12/2010 | Poot |
| 2010/0306713 A1 | 12/2010 | Geisner et al. |
| 2011/0193939 A1 | 8/2011 | Vassigh et al. |
| 2011/0289455 A1 | 11/2011 | Reville et al. |
| 2011/0289456 A1* | 11/2011 | Reville ................... G06F 3/011 715/830 |
| 2012/0036485 A1* | 2/2012 | Watkins, Jr. .......... G06F 1/1626 715/863 |
| 2012/0054670 A1 | 3/2012 | Rainisto |
| 2012/0068925 A1 | 3/2012 | Wong et al. |
| 2012/0105326 A1* | 5/2012 | Jeong ...................... G06F 3/002 345/158 |
| 2012/0155705 A1 | 6/2012 | Latta et al. |
| 2012/0206345 A1 | 8/2012 | Langridge |
| 2012/0242800 A1 | 9/2012 | Ionescu et al. |
| 2012/0249429 A1 | 10/2012 | Anderson et al. |
| 2013/0260884 A1 | 10/2013 | Challinor et al. |
| 2013/0265225 A1 | 10/2013 | Nasiri et al. |
| 2014/0078318 A1* | 3/2014 | Alameh ................. G06F 3/0304 348/207.99 |
| 2014/0237432 A1* | 8/2014 | Geurts .................... G06F 3/005 715/863 |
| 2014/0267019 A1* | 9/2014 | Kuzmin ............. G06K 9/00355 345/156 |
| 2014/0282224 A1* | 9/2014 | Pedley .................... G06F 3/017 715/784 |
| 2014/0282270 A1* | 9/2014 | Slonneger ............... G06F 3/017 715/863 |
| 2014/0282275 A1* | 9/2014 | Everitt ................... G06F 3/017 715/863 |
| 2014/0298266 A1* | 10/2014 | Lapp .................... G06F 3/04883 715/835 |
| 2015/0220776 A1* | 8/2015 | Cronholm ............... G06F 3/017 382/103 |
| 2015/0248166 A1* | 9/2015 | Mayanglambam ..... G06F 3/017 345/173 |

OTHER PUBLICATIONS

Wigdor, et al., "Rock & Rails: Extending Multi-touch Interactions with Shape Gestures to Enable Precise Spatial Manipulations", In Proceedings of the SIGCHI Conference on Human Factors in Computing Systems, May 7-12, 2011, 10 pages.

Klein, et al., "Ergonomic Physical Interaction Zone Cursor Mapping", U.S. Appl. No. 13/955,229, filed Jul. 31, 2013, 49 pages.

Schwesinger, et al., "Natural user Interface Scrolling and Targeting", U.S. Appl. No. 13/802,234, filed Mar. 13, 2013, 62 pages.

Pons-Moll, et al., "Multisensor-Fusion for 3D Full-Body Human Motion Capture", Retrieved at <<http://ieeexplore.ieee.org/stamp/stamp.jsp?tp=&arnumber=5540153>>, In IEEE Conference on Computer Vision and Pattern Recognition, Jun. 12, 2010, 8 pages.

Saenz, Aaron, "Founders of Leap Motion: Our Amazing 3D Tracking Will Be Everywhere", Retrieved at <<http://singularityhub.com/2012/06/13/founders-of-leap-motion-our-amazing-3d-tracking-will-be-everywhere/>>, Jun. 13, 2012, 6 pages.

Wu, et al., "I'm the Jedi!"—A Case Study of User Experience in 3D Tele-immersive Gaming, Retrieved at <<http://cairo.cs.uiuc.edu/publications/view.php?action=list&area=tele&type=all>>, In Proceedings of IEEE International Symposium on Multimedia (ISM), Dec. 13, 2010, 8 pages.

Bevilacqua, et al., "3D Motion Capture Data: Motion Analysis and Mapping to Music", Retrieved at <<http://music.arts.uci.edu/dobrian/motioncapture/BevilacquaRidenourSIMS02.pdf>>, In Workshop/Symposium on Sensing and Input for Media-centric Systems, Retrieved on: Apr. 25, 2013, 5 pages.

"Qt Kinetic Scrolling—from Idea to Implementation", Retrieved at <<http://www.developer.nokia.com/Community/Wiki/Qt_Kinetic_scrolling_-_from_idea_to_implementation>>, Jan. 16, 2012, 4 pages.

Varma, Krishnaraj, "Gesture Detection in Android, Part 1 of 2", Retrieved at <<http://www.krvarma.com/2010/10/gesture-detection-in-android-part-1-of-2/>>, Oct. 10, 2010, 5 pages.

Gardiner, Bryan, "An Accessory that Replaces Mouse Movements with Hand Waves", Retrieved at <<http://www.popsci.com/gadgets/article/2012-08/accessory-replaces-mouse-movements-hand-waves>>, Sep. 14, 2012, 5 pages.

"NPointer—Hand or Arm Gestures Control Computer without Mouse or Touchpad", Retrieved at <<http://www.disabled-world.com/assistivedevices/computer/npointer.php#ixzz2D1Cbqlpf>>, Aug. 21, 2012, 2 pages.

"Kinect Gestures", Retrieved at <<http://support.xbox.com/en-GB/xbox-360/kinect/body-controller>>, Retrieved Date: Nov. 22, 2012, 3 pages.

Schwesinger, et al., "Target and Press Natural User Input", U.S. Appl. No. 13/715,686, filed Dec. 14, 2012, 45 pages.

Carpenter, et al., "Gesture Controller", Retrieved at <<http://www.stanford.edu/~kennykao/cgi-bin/cs247p3-website/>>, Retrieved Date: Oct. 19, 2012, pp. 5.

Nitescu, Daria, "Evaluation of pointing strategies for microsoft kinect sensor device", Retrieved at <<http://diuf.unifr.ch/main/diva/sites/diuf.unifr.ch.main.diva/files/REPORT_DARIA.pdf>>, Feb. 14, 2012, pp. 57.

Andreasen, et al., "Natural User Interface for Web Browsing on a PC", Retrieved at <<http://projekter.aau.dk/projekter/files/58916691/report.pdf>>, Project report, Master of Science in Engineering (MSc), Software Engineering, Jan. 13, 2012, pp. 102.

"Kinect User Interaction and Observed Natural Gestures", Retrieved at <<http://www.transcendingdigital.com/node/53>>, Sep. 28, 2012, pp. 2.

Dam, et al.,"A Study of Selection and Navigation Techniques Using Kinect in VR", Retrieved at <<http://www.tecgraf.puc-rio.br/~abraposo/pubs/SVR2012/Short_Peter.pdf>>, Oct. 18, 2012, pp. 4.

"PCT Search Report and Written Opinion for PCT Application No. PCT/US2013/074335", dated Mar. 28, 2014, Filed Date: Dec. 11, 2013, 11 pages.

\* cited by examiner

SWITCHING INPUT RAILS WITHOUT A RELEASE COMMAND IN A NATURAL USER INTERFACE

BACKGROUND

Touch sensitive screen can be used to provide text input, and other commands such as for scrolling and zooming functions. Panning in a horizontal or a vertical direction can be done by moving a finger or some kind of stylus or pen in a horizontal (X-axis) and/or vertical direction (Y-axis). Zooming can be done by multi-touch finger pinching and then moving the fingers outwards or inwards while the fingers are still in contact with the touch screen. However, each time a user wants to transition from one command to another, some existing systems require the user to lift their fingers and again put them in contact with the touch-screen. The action of lifting the fingers indicates to the system the termination of a current command (e.g., the end of a pan command, the end of a zoom command, etc.).

In natural user interface systems where the display screen is at a distance from the user, user input is provided based on gestures. In such systems, detection of an activation movement (e.g., moving a hand from right to left) locks the user into a particular command, and ignores additional user movements (e.g., up and down) unless the user terminates the currently movement with an explicit release or termination gesture (e.g., putting the hand to a side of the user). Thus, the existing systems recognize individual, discrete gesture inputs corresponding to commands, but only with explicit release gestures inbetween each of the commands.

SUMMARY

Embodiments of the invention enable transition from a first command to a second command in a natural user interface without receiving an explicit termination gesture for the first command. User input is in the form of image data having a plurality of frames. The user input is received from a user via a natural user interface and stored in a memory area associated with a computing device. The image data is accessed by the computing device. A vector difference between an adjustment start position and a current position of the user input is calculated. The adjustment start position represents an initial position at which the user input begins. The vector difference includes a vector position and a vector length. The vector position is compared to rail data stored in the memory area. The vector length is compared to a threshold length stored in the memory area. The rail data describes a plurality of virtual rails associated with an application executing on the computing device. Based on the comparisons, the user input is matched to one of the plurality of virtual rails and a notification describing the matching is provided to the application. The application, thereupon, transitions a first command to a second command corresponding to the one of the plurality of virtual rails without receiving any explicit termination gesture for the first command from the user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
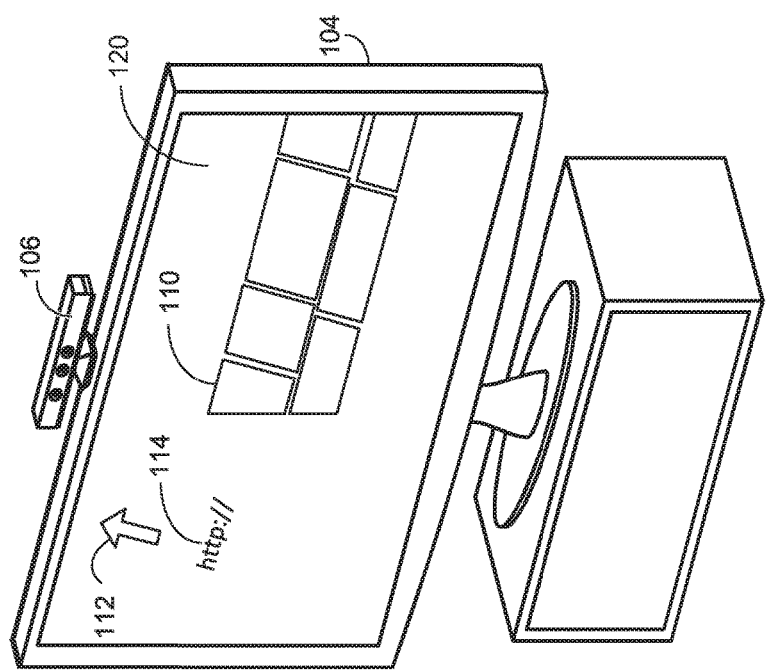
FIG. 1 is an exemplary diagram illustrating a three dimensional physical interaction zone (PHIZ) of a user to control a cursor in a user interface (UI) shown on a two dimensional display.
Figure 1:
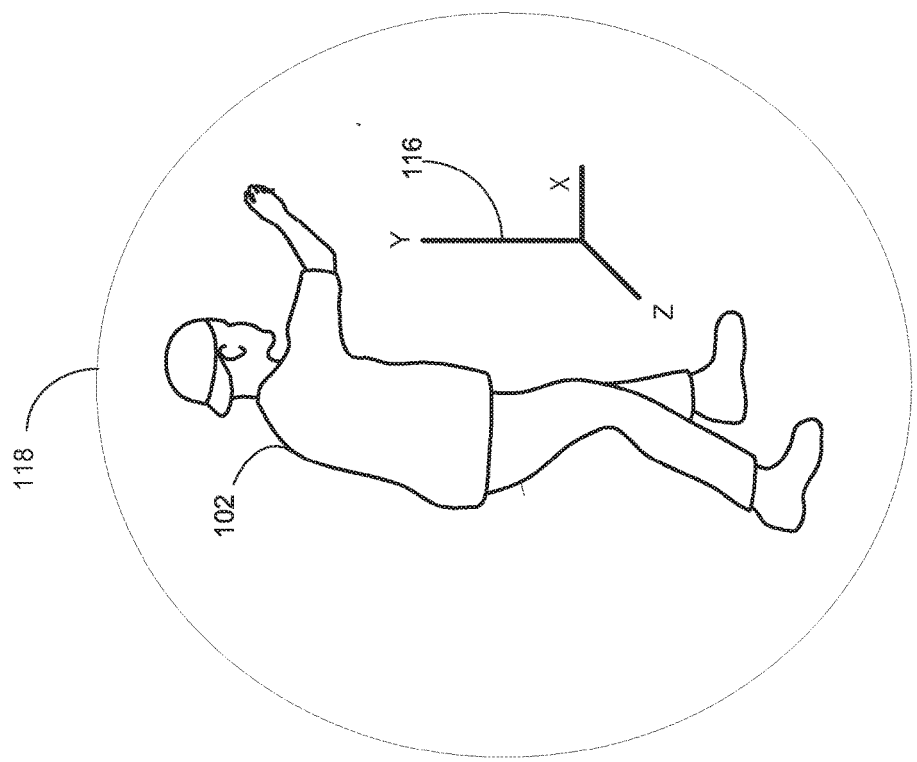

Embodiments of the disclosure provide a method for interpreting multiple simultaneous user inputs received via a natural user interface, and for disambiguating among gestures received in the user inputs. The disambiguation is done along a set of rails. Referring to the figures, some embodiments of the disclosure enable recognition of the natural input gestures of a user 102 along any of the input rails without a necessity for the user 102 to explicitly provide a termination or release gesture. The input rails may be defined, in some embodiments, as paths along which gesture inputs of the user 102 are interpreted as intentional user inputs and corresponding to commands. The input rails define a restriction of motion. For example, a rail for the X axis allows only X motion to be output by the system. Rails may also be the combination of two or more axes, such as a "free pan" rail engaged by diagonal motion. In some embodiments, the paths correspond to axes, such as an X-axis, a Y-axis, and a Z-axis. For example, while the user 102 is panning along a horizontal direction, the user 102 may switch to zoom at any point during the horizontal panning by moving a hand towards or away from themselves without altering the configuration or position of the hand being used for gesture input. While zooming, the user 102 may switch back to panning in a horizontal direction, switch to panning in a vertical direction, or any other action without an explicit release or termination gesture. Similarly, the user 102 may switch from horizontal panning to vertical panning without any need to first release the horizontal panning gesture.

For example, the user 102 while panning along a horizontal direction may see an interesting image and would like to zoom in to see the details of the image. In an embodiment, the user 102 may begin zooming in or out at any point in the panning motion without gesturing to indicate a release or termination, such as dropping the hand or opening a closed palm or inputting any other explicit gesture that indicates a termination of the previous command. Some embodiments perform frame by frame tracking of the user's motion with respect to a three dimensional coordinate system 116 using a skeletal tracking model. The skeletal tracking model tracks the movement of hands of the user 102 in a three dimensional physical interaction zone (PHIZ) 118 of the user 102 to control a cursor 112 in a user interface (UI) 120 and to move the UI 120 displayed on a monitor 104. If the movement of a designated hand (e.g., right hand) is greater than a threshold distance with respect to the immediately previous position in the PHIZ 118 at which the user 102 began the current input, it is inferred that the user 102 is providing a gesture input for the UI 120 to respond. The current user input is analyzed to determine the user commands and the UI 120 responds accordingly. For example if the command is interpreted as a panning command to pan the group of images 110 along the X axis from right to left, the group of images 110 is panned accordingly. As another example, if the command is to change the panning action of the group of images 110 to zooming in of the group of images 110, the group of images 110 is zoomed in without any explicit release command to stop the panning along the X-axis and change to zooming along the Z-axis. In this example, the Z-axis corresponds to the zooming gesture input rail.

Aspects of the disclosure provide a gesture recognition system that tracks the movements of the user 102 in the PHIZ 118 to interpret movements of designated parts of the body of the user 102 as gestures intended for response by a computing system. The computing system includes, for example, a computing device 108, the monitor 104 and sensing device 106 that senses movements of the user 102 in the PHIZ 118, while filtering out motions of the user 102 that are not intended to be gesture inputs. Many applications, such as a gaming system rely on user input in three dimensions to interact with a content on a display of monitor of the gaming system. Aspects of the disclosure enable a more natural user interaction with the gaming system by enabling transition among commands without requiring explicit termination gestures inbetween each of the commands. Aspects of the disclosure provide a system that is natural and intuitive and removes any constraints in gesture recognition thereby allowing the user 102 to interact with the gaming system freely. For example, the user 102 may switch back and forth between panning and zooming in what feels to the user 102 like a single gesture (e.g., rather than requiring additional effort to start/stop the gesture for each change in modality).

Additionally, embodiments of the disclosure provide a man-machine interface that enables manipulation of a virtual three dimensional (3D) object displayed on the monitor 104 as if the object is being held in the hands and moved in 3D space including rotation about any of the three axes X, Y, and Z. The virtual 3D object may be transitioned from one axis to another during rotation as would be done by the user 102 naturally as when the object is held in their hand, without any need to provide a gesture to the system that indicates disengagement from one rail and moving to another rail. For example, aspects of the disclosure may lock to various axis-angle pairs (e.g., quaternions) to smooth the rotation of the object.

Aspects of the disclosure further enable the user 102 to move the cursor 112 on the monitor 104 in any direction using gestures, capture an interface object using the cursor 112, and then provide gesture input for an action to be performed on the interface object. For example, an interface object such as a Uniform Resource Locator (URL) 114 may be captured by moving the cursor 112 to the interface object and then providing a gesture to access the website represented by the URL 114. As another example, the system is capable of interpreting and acting upon a gesture-based command to capture a browser visible on the UI 120 and then a gesture-based command to activate the browser.

Further, unconstrained gesture inputs as described herein may provide continuous vertical and horizontal scrolling of a list, a menu, a spreadsheet, a word document, and the like. Any text and embedded image in a document may also be zoomed. In this manner, the handling of a document becomes like holding a document in hand, moving it left or right and bringing it closer to the eyes or taking it away from the eyes as the user 102 would do with a physical document without any need to first disengage from an earlier command and then begin inputting a new command. The system of the disclosure mimics natural and intuitive handling of images, text, hyperlinked objects, and the like displayed on the monitor 104 without any need for the user 102 to provide to the system any explicit termination gesture between commands.

Referring to FIG. 1, an exemplary block diagram illustrates the computing device 108 associated with the user 102. FIG. 1 also shows a display device such as a television or a computer monitor, which may be used to present a variety of data such as text documents, spreadsheets, media content, game visuals, etc. to the users 102. As an example, the monitor 104 may be used to visually present media content received by the computing device 108 from websites connected to the computing device 108 through a network 306 (e.g., the Internet). In the example illustrated in FIG. 1, the monitor 104 displays a scrollable UI 120 received from the computing device 108 that, in one example, presents selectable information about media content received by the computing device 108. The system depicted in FIG. 1 may include the sensing device 106 such as a 3D camera that includes a depth sensor, a two-dimensional RGB camera, and a multi-array microphone. The 3D camera may, for example, include an IR sensing camera. The sensing device 106 monitors or tracks objects and/or users 102 observed within the PHIZ 118.

The monitor 104 may be operatively connected to the computing device 108. For example, the computing device 108 may include wired or wireless input/output interfaces. The monitor 104 may receive video, audio, or other content from the computing device 108, and/or it may include a separate receiver configured to receive content directly from other sources. In some embodiments, the movements of user 102 are interpreted as controls that may be used to control the cursor 112 displayed on the monitor 104 as part of scrollable UI 120. The user 102 may use movements of their body parts to control selection of information presented in the scrollable UI 120. Further, other input devices (not shown) may also be used to control the location of the cursor 112, such as a remote control device or a touch-sensitive input device or a game controller. In some embodiments, the cursor 112 represents the position of the designated part of the body of the user 102 (e.g., right hand) used for providing gesture input.

The monitor 104 displays a group of images 110 and an interface object such as a URL 114. The group of images 110 may be panned in vertical and horizontal direction and may be zoomed in or out. The interface object may be selected and then activated in various ways.

The sensing device 106 may be operatively connected to the computing device 108 via one or more interfaces. As an example, the computing device 108 may include a universal serial bus to which the sensing device 106 may be connected. Sensing device 106 may be used to recognize, analyze, and/or track one or more human subjects and/or objects within the PHIZ 118, such as user 102 with respect to the three dimensional coordinate system 116. Sensing device 106 may include an infrared light to project infrared light onto the PHIZ 118 and a device configured to receive infrared light. However, other configurations are contemplated.

The computing device 108 may communicate with one or more remote computing devices not shown in FIG. 1. For example, the computing device 108 may receive content directly from a broadcaster, third party media delivery service, or other content provider via network 306. The computing device 108 may also communicate with one or more remote services via the network 306, for example, to analyze image information received from the sensing device 106.

Figure 2:
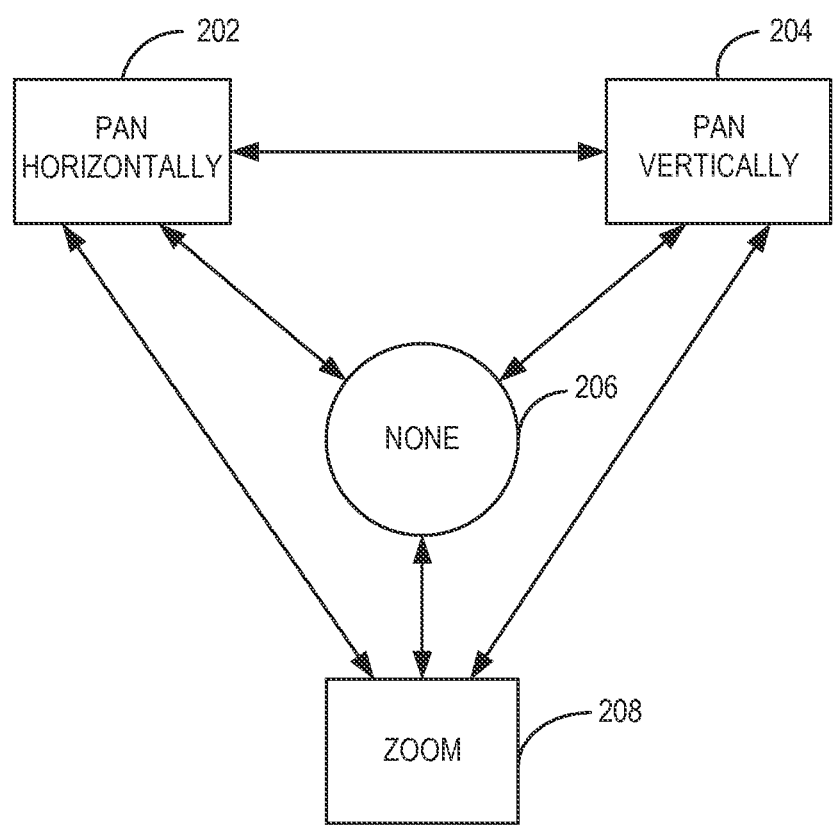
FIG. 2 is an exemplary schematic representation of transitions from an existing scrolling mode to a different scrolling mode without a release command being given.

Referring now to FIG. 2, the figure is an exemplary state diagram illustrating transition among commands without an explicit release command. The states include a no rail state 206, a pan horizontally state 202, a pan vertically state 204, and a zoom state 208. Transitions among the states occurs, as shown in FIG. 2, without an explicit release command between the states. For example, a transition to panning in a horizontal direction may take place from the no rail state 206, from zooming, and/or from panning in a vertical direction without any gesture that indicates a termination of a previous command. Similarly, a transition to panning in a vertical direction may take place from the no rail state 206, from zooming, and/or from panning in a horizontal direction without any gesture that indicates a termination of a previous command. Further, a transition to zooming may take place from the no rail state 206, from panning in a vertical direction, and/or from panning in a horizontal direction.

Figure 3:
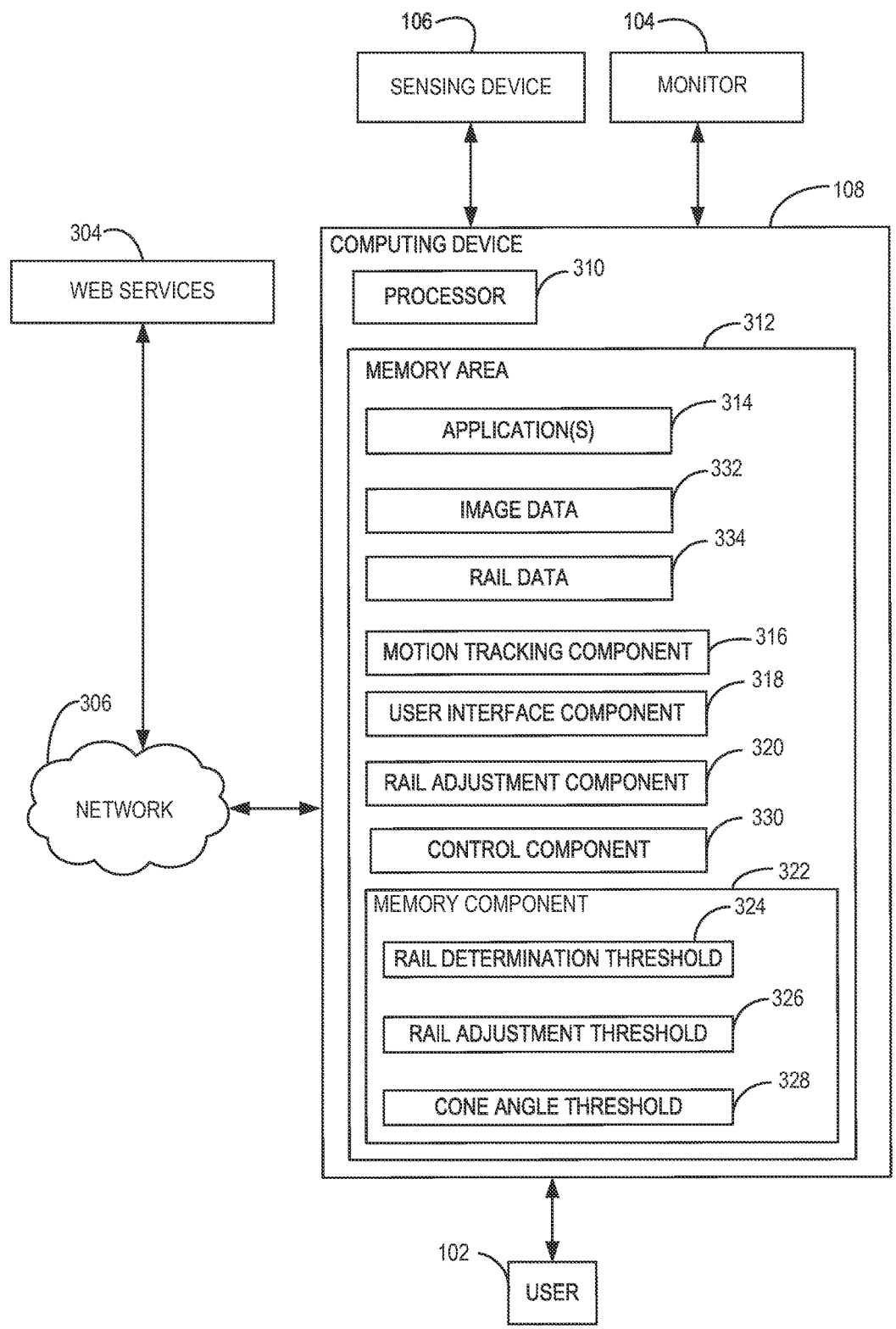
FIG. 3 is an exemplary block diagram illustrating a computing device coupled to a monitor and to a sensing device for sensing the gestures of the user.

Referring next to FIG. 3, an exemplary block diagram illustrates a computing system including the computing device 108 associated with the user 102, the monitor 104, and the sensing device 106. The computing device 108 may be connected to web services 304 via the network 306. The web services 304 include, for example, cloud services. The computing device 108, together with sensing device 106 and monitor 104, represent a system for displaying and enabling interaction of the user 102, via natural user input such as gestures, with content displayed on the monitor 104. The interaction uses a skeletal tracking model that tracks the movement of one or more users 102 within the PHIZ 118. The source of the content may be the computing device 108 or other sources such as cloud services to which the computing device 108 may be connected via the network 306 (e.g., the Internet). The computing device 108 may receive content from one or more remote computing devices (not shown). For example, the computing device 108 may receive content directly from a broadcaster, third party media delivery service, or other content provider. Exemplary content may be media content type including applications, games, audio, video, images, and/or documents for execution by the computing device 108. For example, the media content types may identify content as a device application, a downloadable game, a disc game, a portable media player, video or audio clip, a game or movie trailer, and the like.

In the example of FIG. 3, the computing device 108 may be a computing device that acts as a gaming console in addition to being able to receive commercial television programs, and provide other services such as those provided by known computing platforms. The computing device 108 represent any device executing instructions (e.g., as application programs, operating system functionality, or both) to implement the operations and functionality described herein. The computing device 108 may include any portable or non-portable device including a mobile telephone, laptop, tablet, computing pad, netbook, gaming device, portable media player, desktop personal computer, kiosk, and/or tabletop device. Additionally, the computing device 108 may represent a group of processing units or other computing devices, such as in a cloud computing system or service.

The computing device 108 has at least one processor 310 and a memory area 312. The processor 310 may include any quantity of processing units, and may be programmed to execute computer-executable instructions for implementing aspects of the disclosure. The instructions may be performed by the processor 310 or by multiple processors executing within the computing device 108, or performed by a processor external to the computing device 108. In some embodiments, the processor 310 is programmed to execute instructions such as those illustrated in the figures (e.g., FIGS. 6A through 6F, FIG. 7, and FIGS. 8A through 8B).

In some embodiments, the processor 310 represents an implementation of analog techniques to perform the operations described herein. For example, the operations may be performed by an analog computing device and/or a digital computing device.

The computing device 108 further has one or more computer readable media such as the memory area 312. The memory area 312 may include any quantity of media associated with or accessible by the computing device 108. The memory area 312 may be internal to the computing device 108, external to the computing device 108, or both.

The memory area 312 stores, among other data, one or more applications 314. The applications 314, when executed by the processor 310, operate to perform functionality on the computing device 108 to implement tasks associated with the applications 314, such as interactive games. Exemplary applications 314 may include mail application programs, web browsers, calendar application programs, address book application programs, messaging programs, media applications, location-based services, search programs, gaming applications, and the like. The applications 314 may communicate with counterpart applications or services such as web services 304 accessible via the network 306. For example, the applications 314 may represent downloaded client-side applications that correspond to server-side services executing in a cloud.

Further, the computing device 108 stores in the memory area 312 image data 332, rail data 334, and various computer executable components, among other data. The applications 314 include an application that performs commands received from the user 102 via the natural user interface (e.g., transitioning from a given rail to another rail without receiving an explicit termination command therebetween). The image data 332 includes data related to tracking the movements of the user 102 in the PHIZ 118 on a frame-by-frame basis, gesture inputs of the user 102, and other data. The rail data 334 includes data relating to virtual rails defined within the PHIZ 118, along which user gesture inputs are interpreted as valid by the system shown, for example, in FIG. 1. At the time of initializing the system, the virtual rails are defined along the three axes X, Y, and Z as shown, for example, in FIG. 1. The origin may coincide with the center of aperture of the lens or one of the lenses used for motion tracking by the sensing device 106. The virtual rails may be redefined based on the commands of the user 102, by a manufacturer of the gaming console, and/or by one of applications 314. This data may be stored as rail data 234.

Exemplary computer executable components include a motion tracking component 316, a user interface component 318, a rail adjustment component 320, a memory component 322, and a control component 330. The memory component 322 stores, in some embodiments, a rail determination threshold 324 (RDT), a rail adjustment threshold 326 (RAT) and a cone angle threshold 328 (CAT). The computer executable components may be executed by one or more processors associated with the computing device 108 (e.g., the processor 310 may execute the computer executable components). The user interface component 318 accesses the image data 332 associated with user gesture inputs provided in the form of movement of an identified part of the body of the user 102 (e.g., right hand) via the natural user interface.

Figure 4:
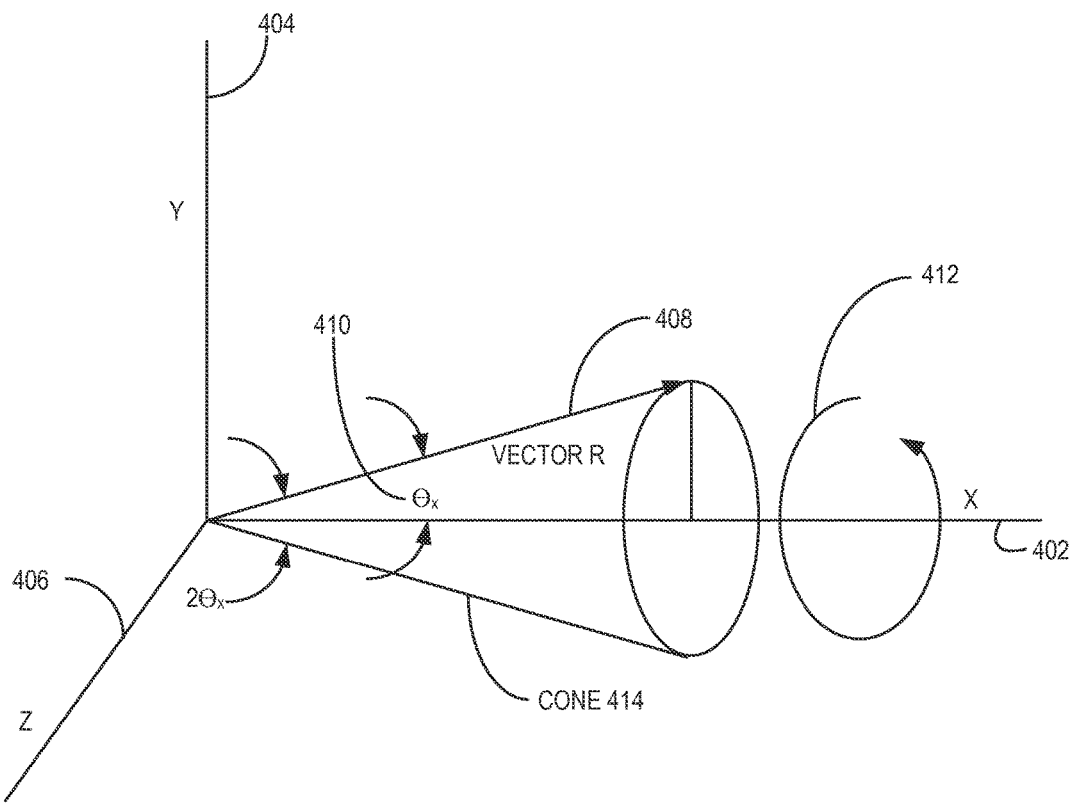
FIG. 4 is an exemplary schematic diagram illustrating the position of a current input vector in the three dimensional physical interaction zone.

The motion tracking component 316 tracks the motion of the user 102 in the PHIZ 118 and interprets gesture inputs. Based on the accessed gesture inputs, the motion tracking component 316 calculates the current position of the cursor 112 with respect to the initial position of the cursor 112 at which the user 102 began the movement of, for example, the right hand to provide gesture input. Because the body part providing gesture input moves in the PHIZ 118, the difference between the current position of the body part and the initial position of the body part may be represented as a vector in the 3D interaction zone with a magnitude and angles $\Theta_x$, $\Theta_y$, $\Theta_z$ with respect to initial (e.g., starting) positions of the rails X, Y and Z. For example, the length may be R and the angle may be $\Theta_x$ with respect to the original position of the X rail as shown in FIG. 4. As shown in FIG. 4, a cone of revolution may be generated by rotating the vector R about the X axis through 360 degrees, thus generating a cone 414. The apex angle of the cone in this example is $2\Theta_x$.

A decision about transitioning the current input rail (e.g., the X rail) to another rail (e.g., the Y rail) may be taken based on the length of the vector R and the apex angle $2\Theta_x$ of the cone 414 when compared, for example, with the stored rail adjustment threshold 326 and the cone angle threshold 328 respectively. The rail adjustment component 320 performs these comparisons and determines whether the length of the vector R (e.g., element 408 in FIG. 4) is greater than the rail adjustment threshold 326 and the angle $2\Theta_x$ is within the cone angle threshold 328. In some embodiments, the rail adjustment component 320 also calculates an accuracy value based on how close the user gesture input is to the potential rail of transition. For example, when the gesture input is closer to the potential rail of transition or the gesture input magnitude is large the system transits to the potential rail of transition faster than otherwise it would do. In this manner, aspects of the disclosure respond more favorably to gesture inputs that are more accurate.

In some embodiments, the values of the rail determination threshold 324, the rail adjustment threshold 326, and the cone angle threshold 328 are determined empirically. In other embodiments, the values of the rail determination threshold 324, the rail adjustment threshold 326, and the cone angle threshold 328 may be determined based on the training data collected from the user 102. In yet another embodiment, the values of the rail determination threshold 324, the rail adjustment threshold 326, and the cone angle threshold 328 may be determined based on crowd-sourced data collected from a plurality of users 102.

The control component 330 provides the results of the comparisons and the accuracy value to one or more of the applications 314 that perform commands of the user 102 received via the natural user interface. The application, based on the provided comparisons and the accuracy value, performs a transition from the command that was being executed at the initial position (e.g., panning horizontally) to the other command indicated by the gesture input (e.g., panning vertically). The time taken for transition may be a function of the calculated accuracy value, in some embodiments. For example, a distance derived from the gesture input may be scaled by a coefficient whose value is based on how off-axis the motion of the gesture input was to the current axis. However, if the user 102 pauses while providing gesture inputs, there is no impact on the operation of transitioning from the command that was being executed at the initial position to the other command, in some embodiments.

In some embodiments, the rail adjustment component 320 compares the length of the vector (e.g., vector 408 in FIG. 4) to stored rail determination threshold 324, and if the length is not greater than the rail determination threshold 324, it is inferred that user input was not an intentional gesture input; rather the designated body part may have moved involuntarily. In such a case, no action is taken on the unintentional user input.

The system shown in FIG. 3 utilizes the computer executable components and one or more of the applications 314 stored within the memory area 312 to track user movements, recognize gesture input, and carry out rail adjustments based on gesture inputs and process input data to perform commands such as panning and zooming for the UI 120.

Referring next to FIG. 4, X axis 402, Y axis 404 and Z axis 406 of the three dimensional coordinate system 116 is shown at an adjustment start position of the cursor 112. As the user input is received, the cursor 112 moves to a new position. A vector difference between the adjustment start position and the current position of the cursor 112 is calculated and is represented as a vector 408 (e.g., vector R). The vector 408 has a magnitude represented by the length R of the vector 408, and a position represented as 410 by angle $\theta_x$ that the vector 408 subtends on an initial position of X axis 402. Similar angles may be generated with respect to the other axes, one or more of which may be zero. If the vector 408 is rotated about X axis 402 as shown by 412, a cone of revolution, as shown in cone 414, is generated. The apex angle of cone 414 is $2\Theta_x$. The system as shown in FIG. 3 compares the length of the vector 408 to a threshold value(s) (e.g., a rail determination threshold 324 or a rail adjustment threshold 326 or both) and the apex angle of the cone 414 to a cone angle threshold (e.g., cone angle threshold 328). If the length of the vector 408 is more than the threshold value and the apex angle of the cone 414 is within the cone angle threshold, a transition in input rail is effected, action corresponding to the input is taken, and the current position of the cursor 112 is set as the new adjustment start position.

It will be appreciated that it is difficult for the user 102 to move their hand exactly along the X, Y or Z axis. Aspects of the disclosure correctly infer the intent of a given input gesture. In one example, the motion tracking component 316 and rail adjustment component 220 are used to correctly interpret the gestures of the user 102 as intentional input even when the movement of the primary hand is not exactly along a specific axis. The movement of the primary hand is tracked with respect to the X/Y/Z axes and the current position of the primary hand is determined as a vector in 3D space within the PHIZ 118 on a frame by frame basis (e.g., at a scanning rate of 30 frames per second) as shown, for example, as vector 408 in FIG. 4. So long as the length of the vector is less than a threshold value with respect to its immediate previous position, the new position is not considered to be an intentional input. If the length of the vector is greater than the threshold value and the angle of the vector with respect to previous input rail is less than a threshold value, the control component 330 interprets this as an input along the previous rail and action is taken corresponding to this input. For example, the UI 120 may pan in a horizontal direction and the origin of the X rail is reset based on this input.

However, referring again to FIG. 4, if the length of the vector 408 is greater than the threshold value and the cone angle $2\Theta_x$ is greater than a threshold value, then rail adjustment component 320 determines whether the vector 408 position is within a threshold value of a different rail, such as the Y rail. If so, the rail adjustment component 320 interprets the input as an input along the different rail (e.g., Y rail) and switches the input rail to the different rail (e.g., Y rail), pans the UI 120 based on the length of the vector R, and resets the current origin of all rails based on the length and position of the vector R.

Similarly, in one embodiment, for each frame, the current position of the cursor 112 is checked with respect to its immediate previous position, the current length and position of the vector R is calculated, and the angles $\Theta_x$, $\Theta_y$, and $\Theta_z$ of the current vector R position with respect to the X/Y/Z rails are calculated. Depending upon the length of the vector R and the angles $\Theta_x$, $\Theta_y$, and $\Theta_z$, the rail adjustment component 320 decides whether a transition from the previous rail should occur. As discussed above, the value of vector R and angles $\Theta_x$, $\Theta_y$, and $\Theta_z$ are compared to corresponding threshold values. Based on the comparison, the rail adjustment component 320 decides whether a transition in rails should occur and if so then to which rail. If it is determined that a transition in rails should occur, then based on the value of $\Theta_x$, $\Theta_y$, and $\Theta_z$, the rail adjustment component 320 decides the rail (or plurality of rails) to which the transition from the existing rail should occur. Accordingly, transition to the determined rail is made and the origin of all the rails is set to the current position of the rails.

Figure 5:
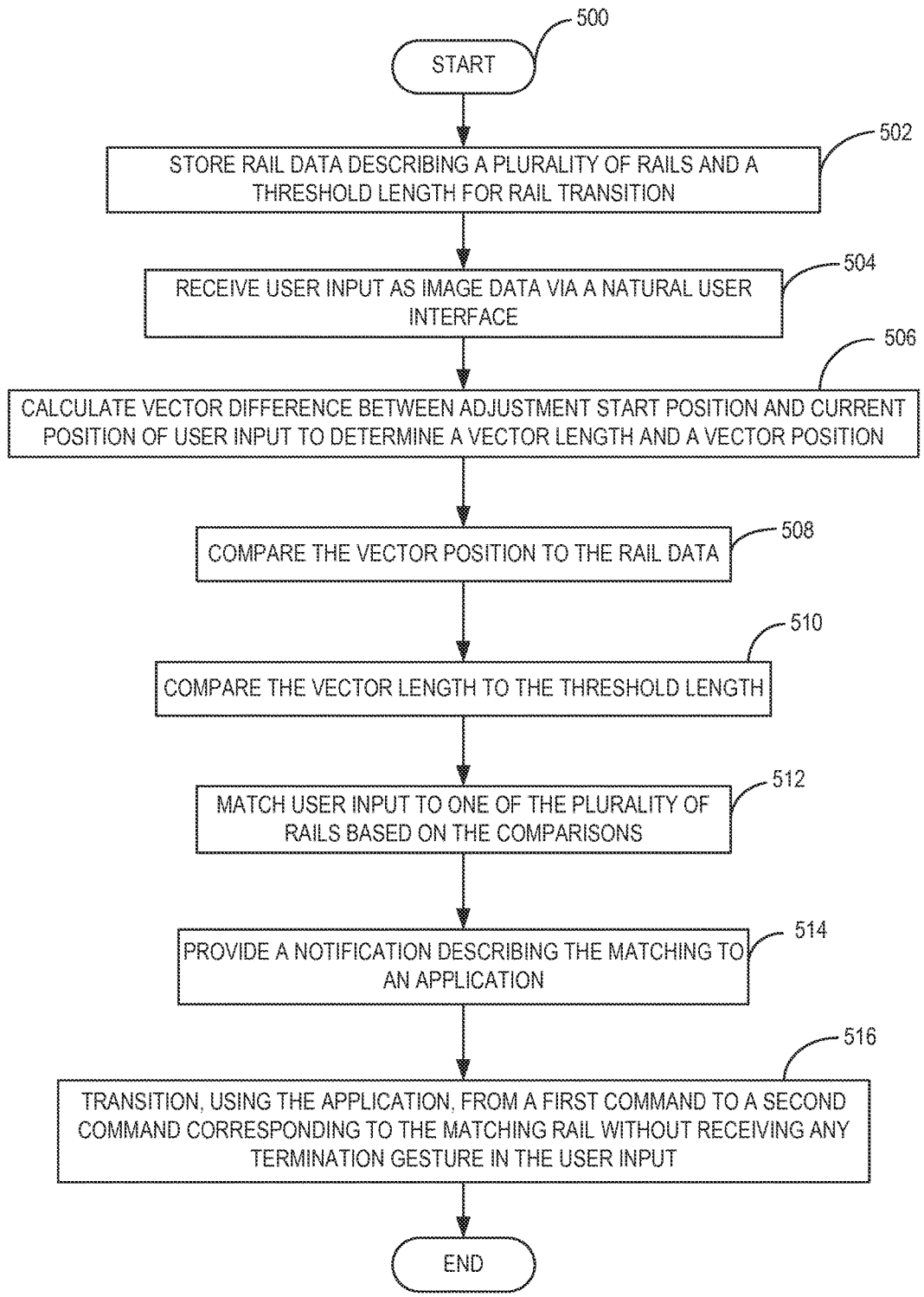
FIG. 5 is an exemplary flowchart illustrating, in one embodiment of the invention, transitioning from one command to another command without receiving a termination gesture.

Referring next to FIG. 5, an exemplary flowchart illustrates a method of transitioning from one command to another command without receiving a termination gesture. The operations begin at 500. At 502, the rail data 334 describing a plurality of rails and a threshold length (such as those shown in FIGS. 1, 2, 3, and 4 and described in the related description) are stored in a memory area. At 504, user input in the form of the image data 332 including a plurality of frames (such as the data collected during scanning of the user movements in the PHIZ 118 is received via a natural user interface. For example, the intent to manipulate the UI along the rails may be signaled by a gesture such as gripping the hand, or simply by the state of the application 314 itself. This signal, if one is present, resets the consideration points for all rails, in some embodiments. At 506, a vector difference between an adjustment start position and a current position of user input is calculated to determine a vector length and a vector position (such as those shown in FIG. 4). At 508, the vector position is compared to the rail data 334. At 510, the vector length is compared to the threshold length. At 512, the user input is matched to one of the plurality of rails based on the comparisons. At 514, a notification is provided to an application (such as one of the applications 314) describing the matching. At 516, the application performs a transition from a first command to a second command corresponding to the one of the plurality of rails without receiving a termination gesture in the user input.

Figure 6A:
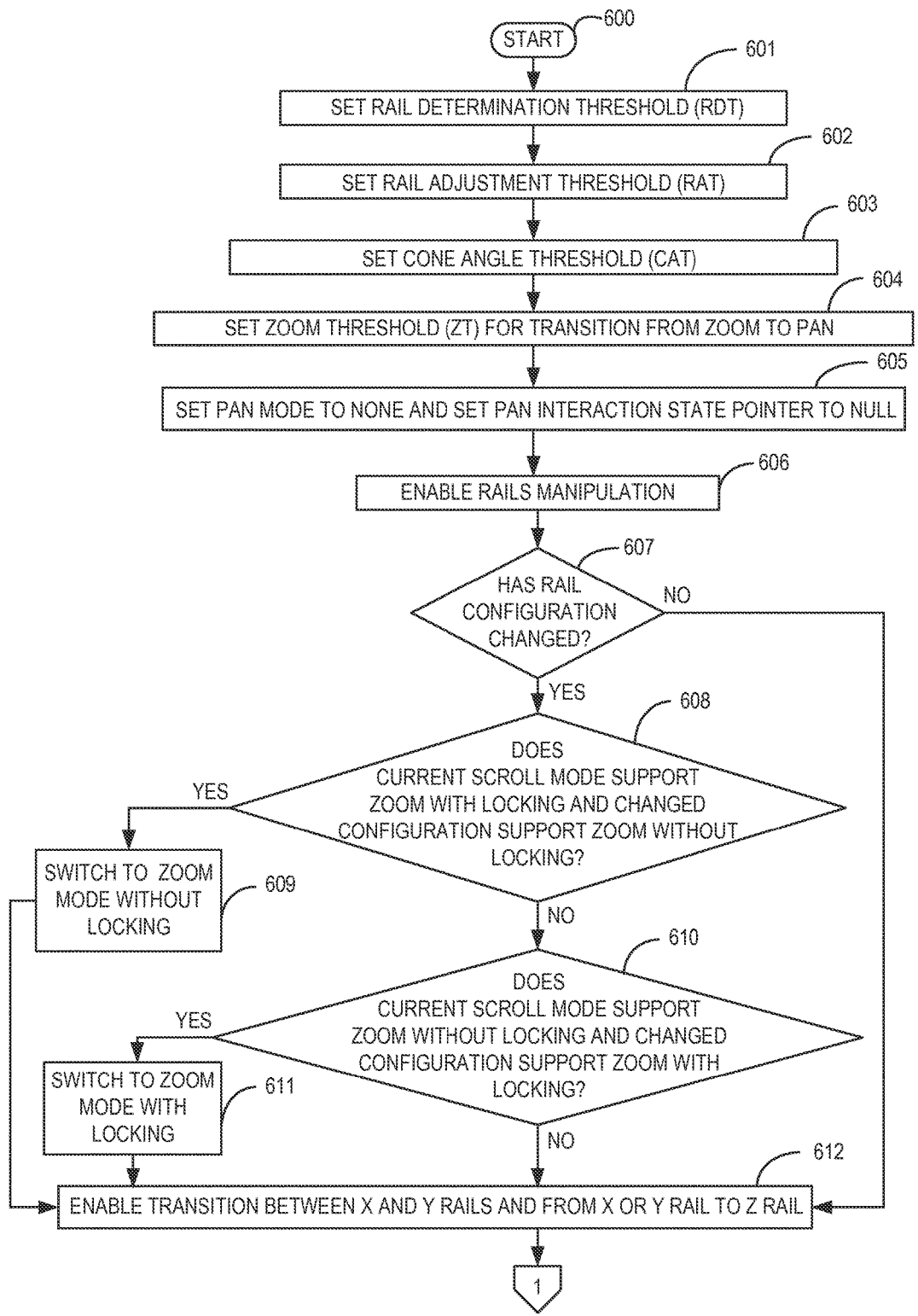
FIG. 6A through FIG. 6F show exemplary flow charts illustrating operations performed by the computing device in conjunction with other devices to detect user inputs and transition among rails based on user input.

FIGS. 6A through 6F illustrate exemplary flowcharts depicting operations of the system. Referring to FIG. 6A, at 600, the operations begin. At 601, the RDT is set. At 602, a rail adjustment threshold value (RAT) is set. At 603, a cone angle threshold value (CAT) is set. At 604, a zoom threshold value (ZT) for transition from zoom to pan is set. In some embodiments, the system employs polar coordinates for PHIZ 118 which causes the X-Y coordinate space to be compressed at lower zoom values. Accordingly, a minimum zoom value is set for considering transition from zoom to pan. In some cases of potential transition from zoom to pan, a check is made to ensure that the minimum zoom value as set at 604 is satisfied before an attempt is made to transition from zoom to pan. At 605, the system is initialized with pan mode being set to none and pan interaction pointer being set to null. At 606, rails manipulation is enabled. At 607, it is checked if rail configuration has changed. If rail configuration has not changed, then transition between X rail panning to Y rail panning is enabled and transition from X or Y rails to Z rail (zoom) is enabled at 612.

Because the zoom mode may be with cursor lock or without cursor lock, if the rail configuration has changed, then at 608 it is checked whether the current scroll mode supports zoom with locking and the changed configuration supports zoom without locking. If the changed configuration supports zoom without locking, at 609 the mode is switched to zoom without locking. If the result of the check at 608 is not true, then at 610 it is checked if the current scroll mode supports zoom without locking and the changed configuration supports zoom with locking. If this condition is true, then at 611 the mode is changed to zoom with locking. After the operations at 609 or 611 or if the result of check at 610 is not true, control is transferred to 612 and rail transitions are enabled as discussed above. From 612, control is transferred to 613 as shown in FIG. 6B.

Figure 6B:
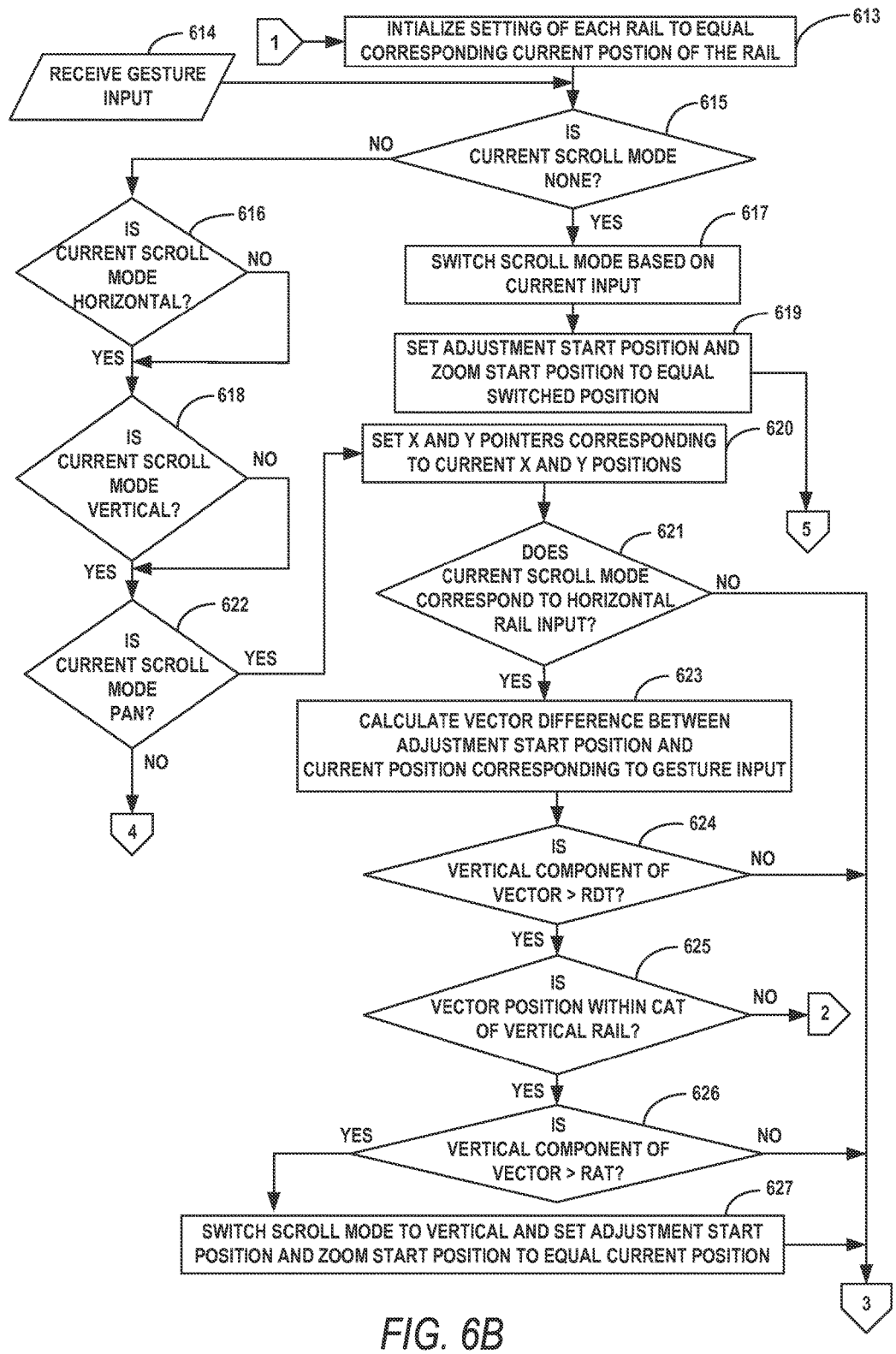

Referring next to FIG. 6B, at 613 each of the rails is initialized to its corresponding current positions. At 614, user gesture input is received. At 615, the system checks if there is no existing scroll mode. If this condition is true, then at 617, the scroll mode is switched based on current user input and at 619 the adjustment start position and zoom start position is set to the currently switched position. Thereafter the control is transferred to 650 as shown in FIG. 6E and adjustments corresponding to current gesture input are completed.

If, however, there was an existing scroll mode at 615, before the gesture input was received, then at 416, it is checked if the existing scroll mode is horizontal panning. If this is true, this condition is carried and further at 618 it is checked if the existing scroll mode is vertical panning, because panning can be either horizontal or vertical or both. At 622, it is checked if the current scroll mode is panning. This condition is true if either or both the decision boxes at 616 and 618 return "YES." If the existing scroll mode is panning, then at 620 pointers are set corresponding to the current X and Y positions. If the result of the check at 616 is not true, the control is transferred to 618. If the result checking at 618 is not true, then the control is transferred to 622. If the result of checking at 622 is also not true, the control is transferred to 643 as shown in FIG. 6E.

At 621, the computing device 108 implementing the operations checks if the existing scroll mode corresponds to horizontal rail input. If this condition is true, then at 623, a vector difference between the adjustment start position of the cursor (e.g., the existing or initial position) and the current cursor position based on gesture input is calculated. As discussed earlier, the result is a vector with a magnitude and a position in the PHIZ 118. To determine whether the gesture input indicates a switching of rails from horizontal panning to vertical panning, the length of the component of the vector (e.g., vector R shown as 408 in FIG. 4) along vertical rail is compared to the RDT at 624 to check if the length is greater than the RDT. If this condition is true, the position of the vector is compared to the CAT at 625 to see if the position of the vector is close enough to the vertical rail to interpret that the gesture input indicates the user's intention is to switch from horizontal panning to vertical panning. If this condition is also true, then the length of the component of the vector along vertical rail is compared to the RAT at 626 to check if the length is greater than the RAT. If this condition is also true, then at 627, the rail is switched from horizontal panning to vertical panning and the new adjustment start position for panning and zooming is set corresponding to the current cursor position.

Figure 6C:
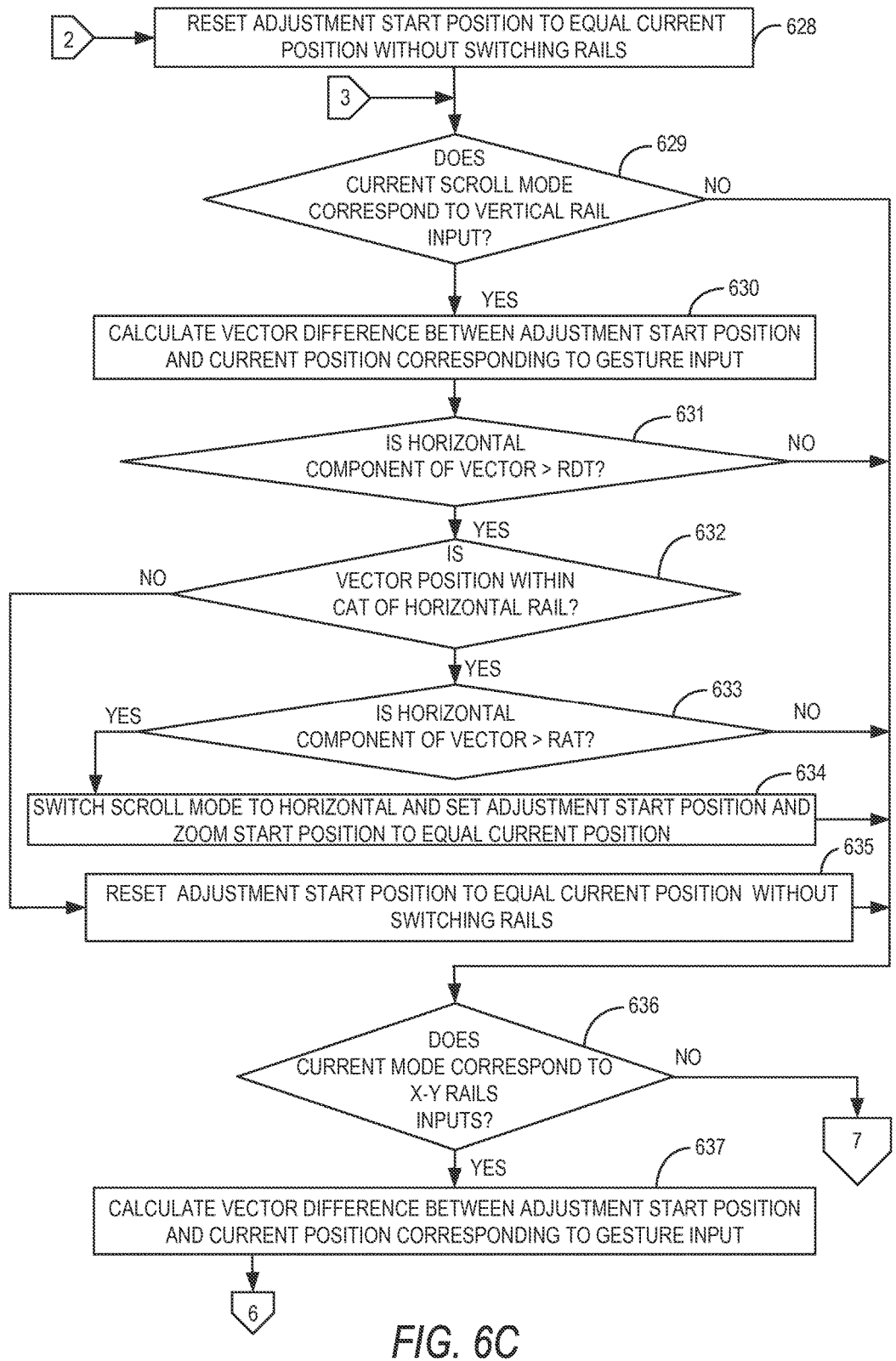

If the length of the component of the vector along vertical rail is not greater than the RDT at 624 or the result of check at 621 is not true, then the system infers that a transition to vertical panning is not intended by the gesture, and control is transferred to 629 of FIG. 6C to check if the current scroll mode corresponds to vertical panning. Further, if the length of the component of the vector along vertical rail is greater than the RDT as checked at 624, but the vector position is not within the CAT of the vertical rails as checked at 625, then it is inferred that the input is along the previous rails and the current adjustment start position is reset corresponding to current gesture input without switching rails as shown at 628 in FIG. 6C. However, if the length of the component of the vector along vertical rail is not greater than the RAT as checked at 626, control is transferred to 629 as shown in FIG. 6C.

Referring now to FIG. 6C, at 628 the adjustment start position is reset corresponding to the current cursor position without switching rails. At 629, it is checked if the existing scroll mode corresponds to vertical rail input. If this condition is true, then at 630, a vector difference between adjustment start position (e.g. the existing or initial position) and the current position based on gesture input is calculated. As discussed earlier, the result is a vector with a magnitude and a position in the PHIZ 118. To determine whether the gesture input indicates a switching of rails from vertical panning to horizontal panning, the length of the component of the vector along horizontal rail is compared to the RDT at 631 to check if the length is greater than the RDT. If this condition is true, then the position of the vector is compared to the CAT at 632 to see if the position of the vector is close enough to the horizontal rail to interpret the gesture input as the user's intention to switch from vertical panning to horizontal panning. If this condition is true, then the length of the component of the vector along the horizontal rail is compared to the RAT at 633 to check if the length is greater than the RAT. If this condition is also true, then the rail is switched from vertical panning to horizontal panning at 634 and the adjustment start position of panning and zooming is set corresponding to the current cursor position.

If, however, the length is not greater than the RAT, the adjustment start position is reset to the current position corresponding to gesture input at 635 without switching rails. If however, the result of check at 629 or 631 or 633 is not true, then control is transferred to 636. Further, if the result of check at 632 is not true, then the system infers that transition of rails is not intended and the new adjustment start position is reset to the current cursor position without switching of rails.

Figure 6D:
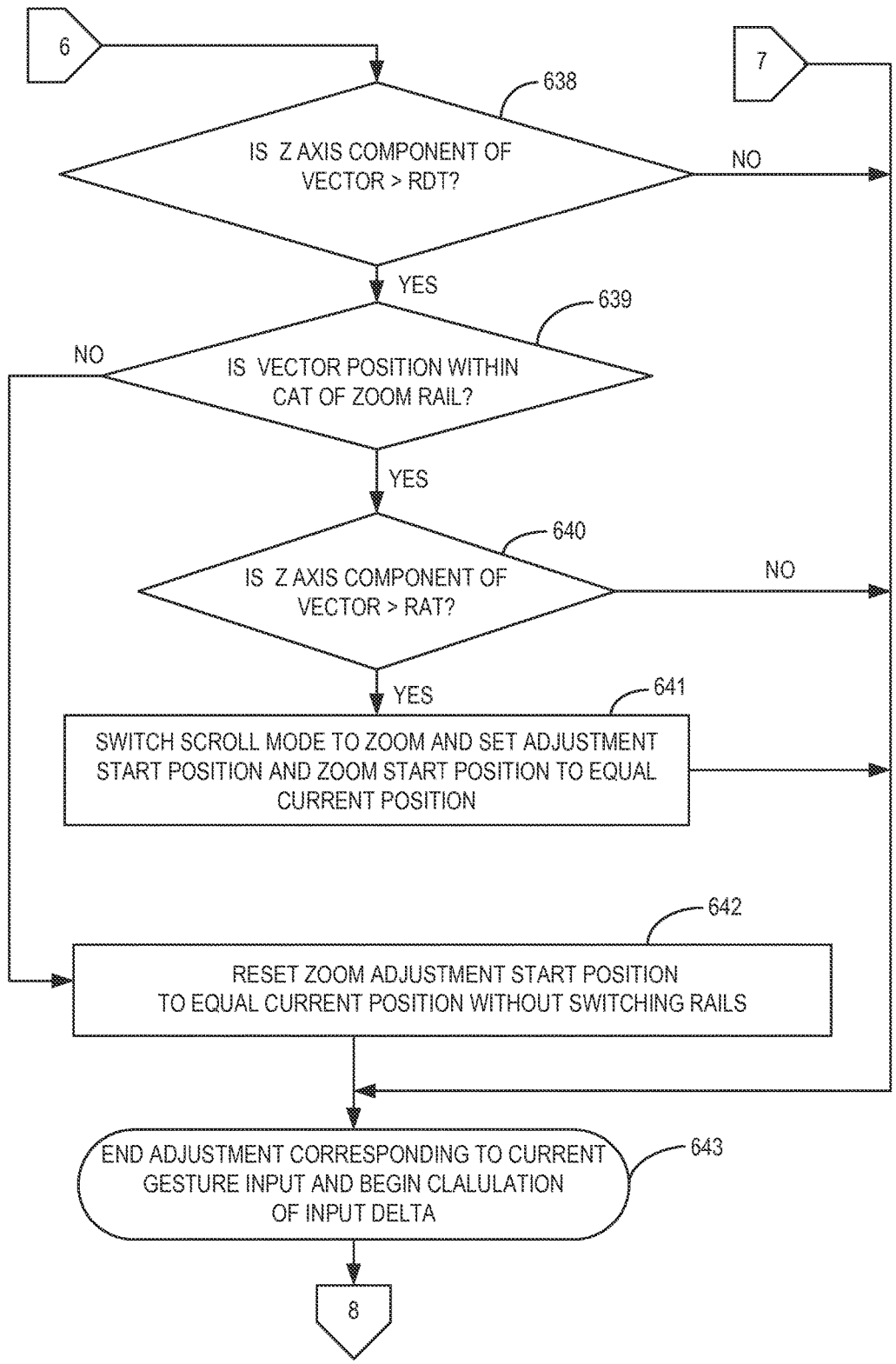
Figure 6E:
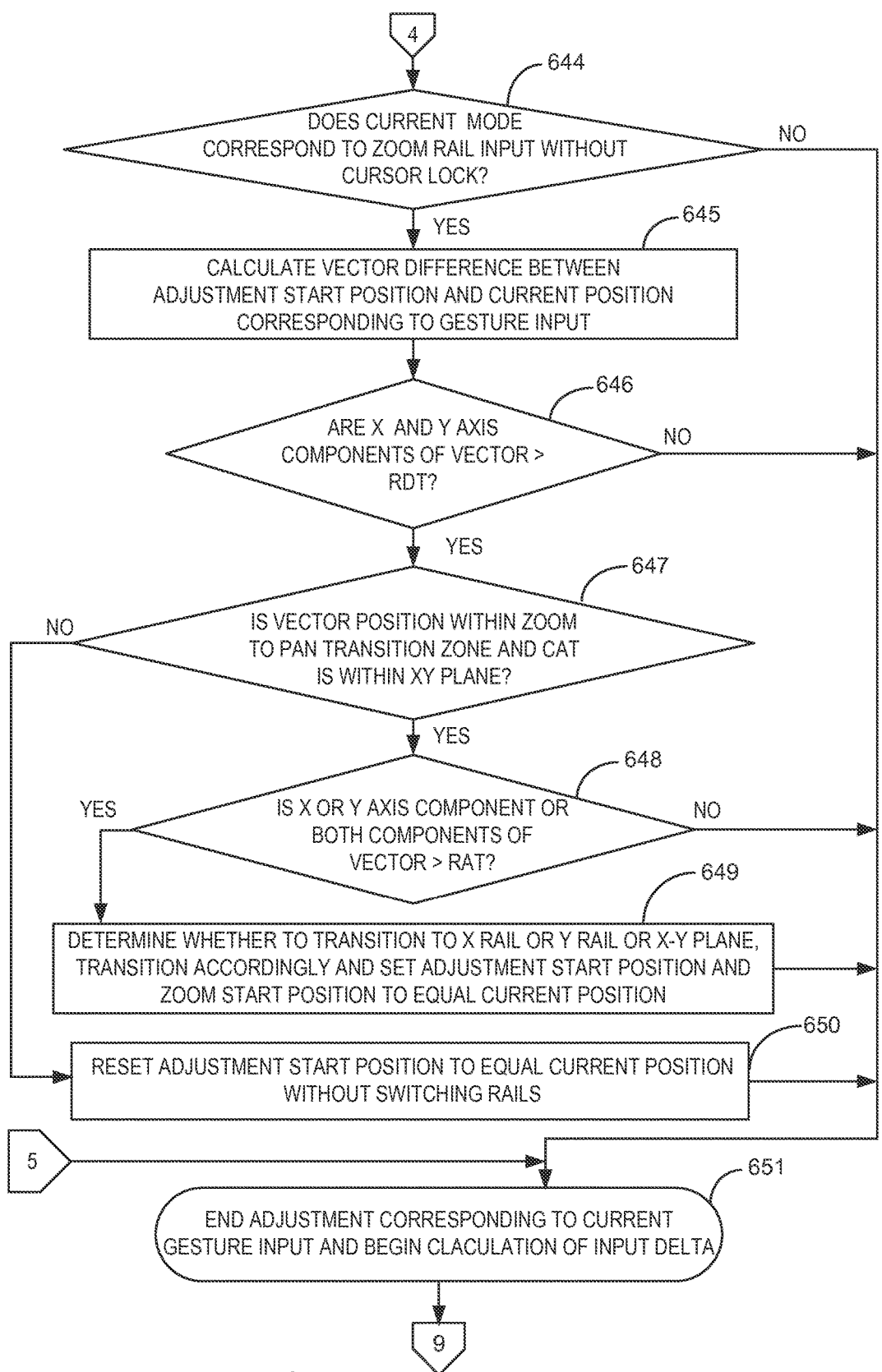

Further, at 636, it is checked if the existing mode corresponds to panning along both vertical and horizontal rails. If this condition is true, a vector difference between the adjustment start position and the current position corresponding to gesture input is calculated at 637. As discussed earlier, the result is a vector (e.g., vector 408 in FIG. 4). The control is thereafter transferred to 638 as shown in FIG. 6D. If, however, the result of check at 636 is not true, then adjustment corresponding to current gesture input ends as shown at 642 in FIG. 6D.

Figure 6F:
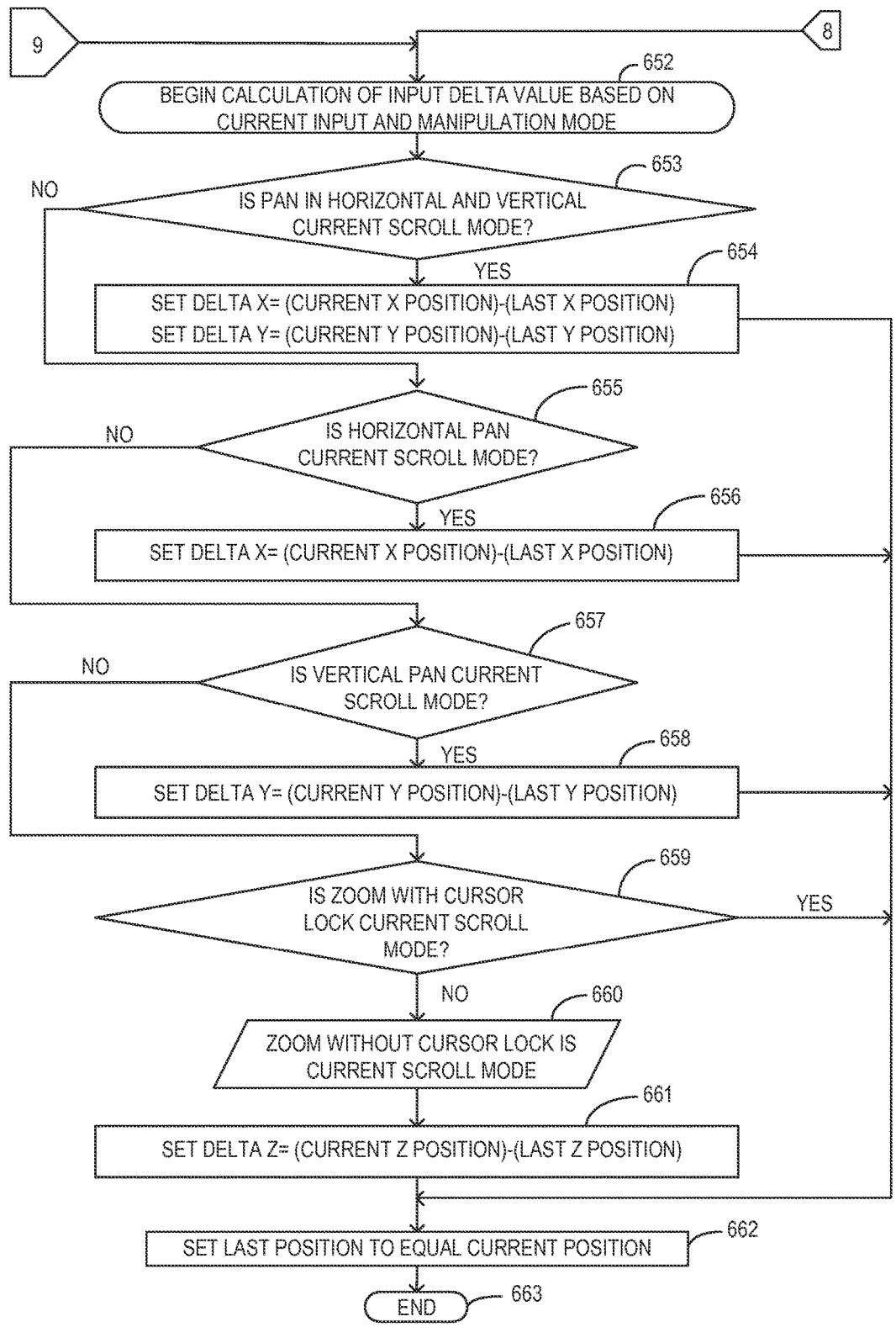

Turning now to FIG. 6D, at 638, it is checked if the Z axis component of the vector calculated at 637 is greater than the RDT. If this condition is true, then at 639, it is checked if the position of the vector is within the CAT of zoom rail. If this condition is true then at 640, it is checked if the Z axis component of the vector calculated at 637 is greater than the RAT. If this condition is also true then at 641, the scroll mode is switched to zooming and the adjustment start position of all the rails is set corresponding to the current cursor position. The process for transition of rails ends at 643, and control is transferred to 652 as shown in FIG. 6F. Further, if the result of check at 638 is not true, adjustment corresponding to current gesture input ends. Similarly, if the result of check at 640 is not true, the adjustment corresponding to current gesture input ends. Further after switching scroll mode at 641, the adjustment corresponding to current gesture input ends. However, if the result of check at 639 is not true, the zoom adjustment start position is reset to the current cursor position without switching the rails as shown at 642.

Referring now to FIG. 6E, at 644 it is checked if the current scroll mode corresponds to zoom rail input without cursor lock. If the current scroll mode corresponds to zoom rail input without cursor lock, then at 645 a vector difference between the adjustment start position and the current position corresponding to the gesture input is calculated. The calculation results in a vector with a magnitude and a position similar to, for example, the vector R (e.g., 408 in FIG. 4). At 646, it is checked if the X and Y components of the length of the vector are greater than the RDT. If they are, then at 647 it is checked if the vector position is within the zooming to panning transition zone. Panning may be along the X rail, the Y rail, and/or the X-Y plane, in some embodiments. Further, it is checked whether the vector position is within the X-Y plane. If the conditions at 647 are met then, at 648, it is checked if the X axis or Y axis component or both X axis and Y axis components of the length of the vector are greater than the RAT. If this condition is also met then at 649 a suitable transition from zoom rail to pan rail is done. For example, if the X component is greater than the RAT, transition to the X rail is performed. If the Y component is greater than the RAT, transition to Y rail is performed. If both the X and Y components are greater than the RAT, transition to X-Y plane is performed and panning both vertically and horizontally is enabled. For example, if the user 102 moves a hand diagonally across the monitor 104 in the PHIZ 118, the UI 120 may pan both horizontally and vertically. Further, at 649, the new adjustment start position is set corresponding to current cursor position. Thereafter, the control is transferred to 651 signaling completion of the adjustment corresponding to the current gesture input.

If, however, the result of check at 647 is not true, then the adjustment start position is set corresponding to the current cursor position without switching rails as shown at 650. Further, if the result of the check at 646 or at 648 is not true, then adjustments corresponding current gesture input are ended as shown at 651. Further, after completion of settings or resetting at 649 or 650 respectively, the process ends at 651. From 651, control is transferred to 652 for calculation of incremental input values along X, Y, and Z rails as shown in FIG. 6F.

Turning now to FIG. 6F, at 652, the process of calculating incremental values of gesture inputs along X, Y, and Z rails begins. At 653, it is checked if panning both along horizontal and vertical axes is the current scroll mode. If it is so, then at 654, the difference between the X axis component of the current cursor position based on gesture input and the last cursor position is calculated, as well as the difference between the Y axis component of current cursor position based on gesture input and the last cursor position. These values are used for panning the UI 120 along the X and Y rails respectively.

If, however, the result of the check at 653 is not true, then at 655, it is checked whether only horizontal panning is the current scroll mode. If it is so, then at 656, the difference between the X axis component of the current cursor position based on gesture input and the last cursor position is calculated and used for panning along the X axis. If, however, the result of the check at 655 is not true, then at 657, it is checked whether only vertical panning is the current scroll mode. If it is so, then at 658, the difference between the Y axis component of the current cursor position based on gesture input and the last cursor position is calculated and used for panning along the Y axis. If however, the result of the check at 657 is not true, then at 659, it is checked whether zooming with cursor lock is the current scroll mode. If it is not so, then at 660, the system outputs zoom without cursor lock as the current scroll mode. Additionally, the difference between the Z axis component of the current cursor position based on gesture input and the last cursor position is calculated at 661 and used for zooming. At 662, based on the results of the above testing and calculations, the last cursor position is set equal to the current cursor position. However, if the result of the check at 659 is true, control is transferred to 662. Further, after calculating the values of differences in the X, Y, and X axis components based on the current and last cursor positions as shown at 654, 656, 658, and 661, control is transferred to 662 for setting the last cursor position to equal the current cursor position. The operations end at 663.

Figure 7:
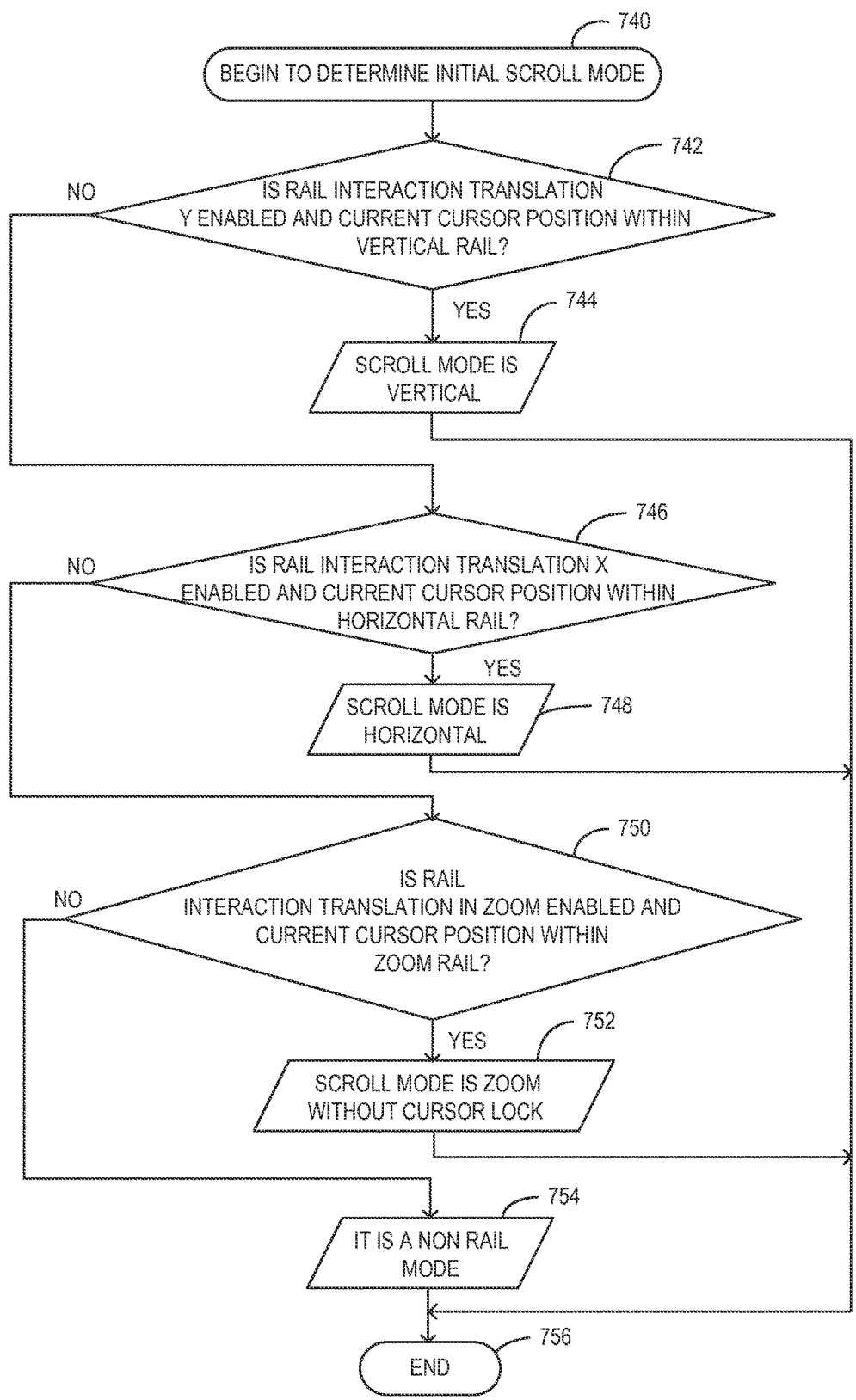
FIG. 7 shows an exemplary flow chart illustrating a process for determining scroll modes.

Referring next to FIG. 7, at 740, the operation to determine the initial scroll mode begins. At 742, it is checked if rail interaction translation in the Y axis is enabled and the current cursor position is within the vertical rail. If this is true, then the current scroll mode is vertical as shown at 744. If the result of the check at 742 is not true, then at 746 it is checked if rail interaction translation in the X axis is enabled and the current cursor position is within the horizontal rail. If this is true, then the current scroll mode is horizontal as shown at 748. If the result of the check at 746 is not true, then at 750 it is checked if rail interaction translation in the zoom axis is enabled and the current cursor position is within zoom rail. If this is true, then the current scroll mode is zooming without cursor lock as shown at 752. If the result of the check at 750 is not true, then the mode is a non-rail mode as shown at 754. The process of determining the scroll mode ends at 756. The information collected during the above operations is used for further processing.

Figure 8A:
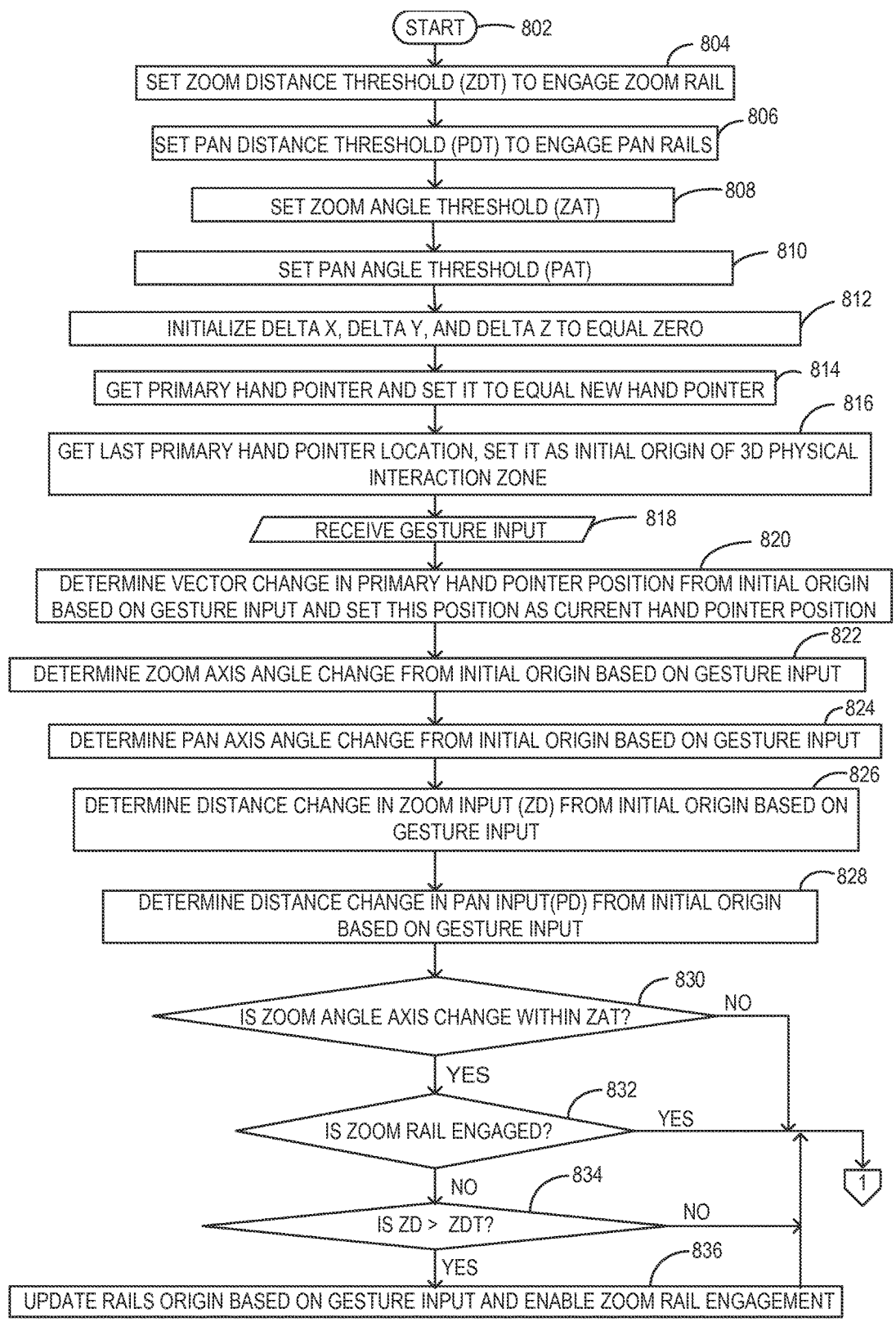
FIG. 8A through FIG. 8B show exemplary flow charts illustrating operations performed by the computing device in conjunction with other devices to detect user inputs and transition among rails based on user input.
Figure 8B:
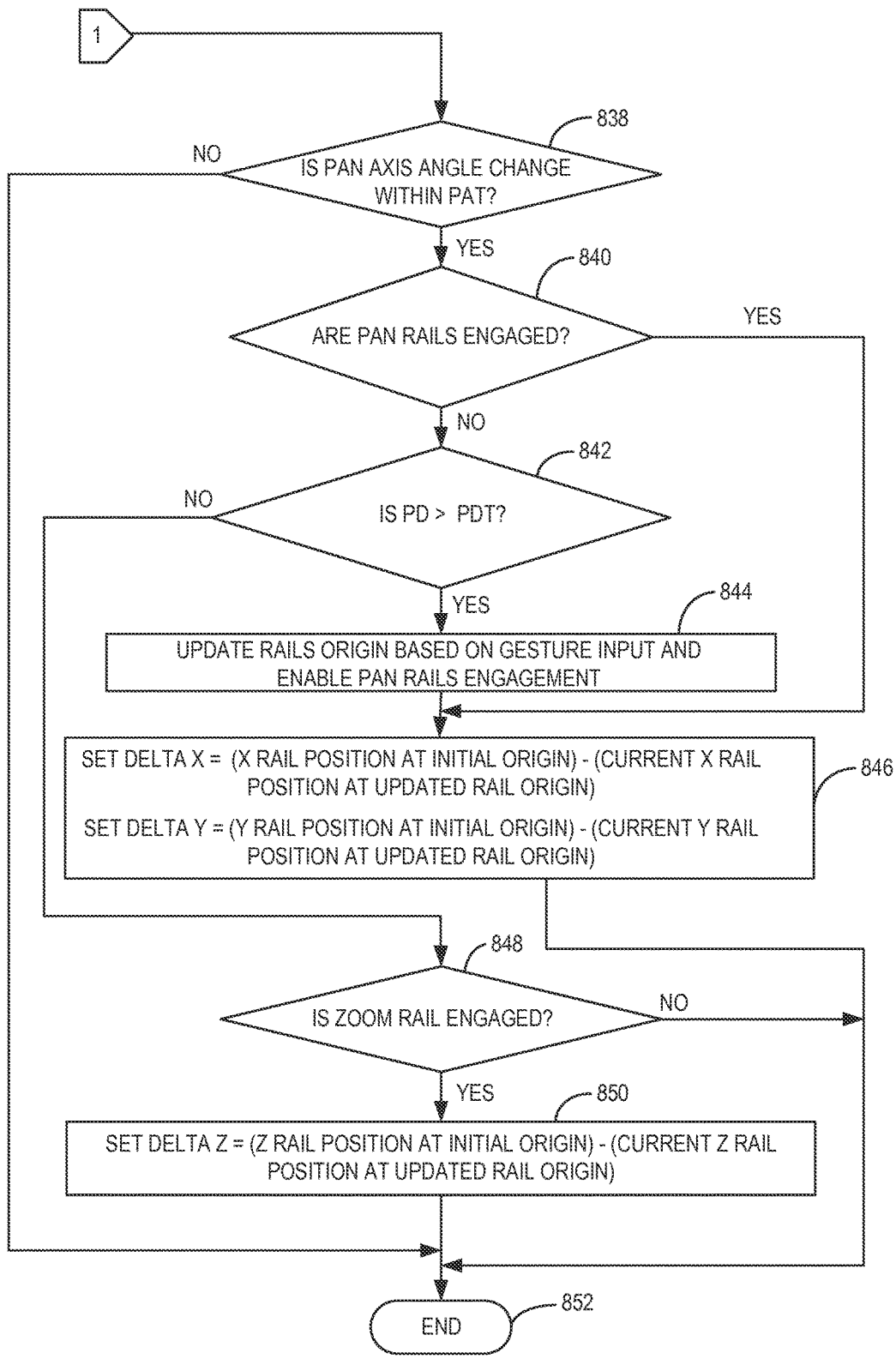

Referring now to FIGS. 8A through 8B, the figures illustrate flowcharts of another embodiment of performing rail transition based on user input. The operations begin at 802. At 804, a threshold distance to engage a zoom rail is set. This threshold distance is referred to as a zoom distance threshold (ZDT). At 806, a threshold distance to engage pan rails is set. This threshold distance is referred to as a pan distance threshold (PDT). At 808, a threshold value for a zoom angle is set. This threshold value is referred to as a zoom angle threshold (ZAT). At 810, a threshold value for a pan angle is set. This threshold value is referred to as a pan angle threshold (PAT). At 812, the system is initialized by setting incremental distances in the X, Y, and Z directions to equal zero. At 814, a primary hand pointer is obtained and set to equal a new or current hand pointer. The primary hand pointer corresponds to the hand that is designated to be used for gesture inputs. At 816, the last hand pointer location is obtained and set as the initial origin of the PHIZ 118. At 818, a gesture input from the user 102 is received. At 820, a vector change in primary hand pointer position from the initial origin to the current position based on gesture input is determined and set as the current hand pointer position. At 822, a zoom axis angle change from the initial origin to the current position based on gesture input is determined. At 824, a pan axis angle change from the initial origin to the current position based on gesture input is determined. At 826, a distance change in the zoom component of input, referred to as a zoom distance (ZD), from initial origin to the current position based on gesture input is determined. At 828, a distance change in pan component of input, referred to as a pan distance (PD), from initial origin to the current position based on gesture input is determined.

At 830, a check is made to see if the zoom angle axis change is within the ZAT value. If it is, then at 832 a check is made to see if the zoom rail is engaged. If it is not engaged then at 834 a check is made to see if the ZD is greater than the ZDT. If it is, then at 836 the rails origin is updated based on gesture input and zoom rail engagement is enabled. The control is thereafter transferred to 838 as shown in FIG. 8B. Further, if the result of checking at 830 or 834 is not true, the control is transferred to 838 as shown in FIG. 8B. Additionally, if the result of checking at 832 is true, the control is transferred to 838 as shown in FIG. 8B.

Referring next to FIG. 8B, at 838 a check is made to see if the pan angle axis change is within the PAT value. If it is, then at 840 a check is made to see if the pan rails are engaged. If they are not engaged, then at 842 a check is made to see if the PD is greater than the PDT. If it is, then at 844 the rails origin is updated based on gesture input and pan rails engagement is enabled. Thereafter, at 846, an incremental change in the X rail is calculated as a difference between the X rail position at initial origin and the current X rail position at the updated origin. Similarly, an incremental change in the Y rail is calculated as a difference between the Y rail position at initial origin and the current Y rail position at the updated origin. The operation, thereafter, ends at 852. However, if the result of the check at 838 is not true, the operation ends at 852. Further, if a check at 840 shows that pan rails are engaged, control is transferred to 846 for determining incremental changes in the X and Y rails based on gesture input. Further, if the result of check at 842 is not true, control is transferred to 848 to check if the zoom rail is engaged. If the zoom rail is engaged, then at 850 an incremental change in the zoom rail from the initial origin to the current zoom rail position at the updated origin is calculated. The operation, thereafter, ends at 852. The calculated values of the incremental changes in the X, Y, and Z rails are used for panning and zooming.

Additional Examples

In some embodiments, feedback informs the user 102 of how close the gesture input is to another rail. The feedback may include a visual image, a sound that increases in intensity, a change in cursor color, and the like.

Exemplary Operating Environment

Exemplary computer readable media include flash memory drives, digital versatile discs (DVDs), compact discs (CDs), floppy disks, and tape cassettes. By way of example and not limitation, computer readable media comprise computer storage media and communication media. Computer storage media include volatile and nonvolatile memories, removable and non-removable memories implemented in any method or technology for storage of information such as computer readable instructions, data structures, program modules and other data. Computer storage media are tangible and mutually exclusive to communication media. Computer storage media exclude propagated data signals. Further, for the purposes of this disclosure, computer storage media are not signal per se. In some embodiments, computer storage media are implemented in hardware. Exemplary computer storage media include hard disks, flash drives, and other solid-state memories. In contrast, communication media typically embody computer readable instructions, data structures, program modules, or other data in a modulated data signal such as a carrier wave or other transport mechanism and include any information delivery media.

Although described in connection with an exemplary computing system environment, embodiments of the disclosure are capable of implementation with numerous other general purpose or special purpose computing system environments, configurations, or devices.

Examples of well-known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like. Less mobile or stationary computing systems described herein may at least be used to receive the messages and the movement information. Such systems or devices may accept input from the user 102 in any way, including from input devices such as a keyboard or pointing device, via gesture input, proximity input (such as by hovering), and/or via voice input.

Embodiments of the invention may be described in the general context of computer-executable instructions, such as program modules, executed by one or more computers or other devices in software, fare, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for transitioning from one gesture to another in a natural user interface without an explicit termination therebetween. For example, the components and functionality described herein constitute exemplary means for accessing the image data 332 corresponding to user input received from the user 102 via a natural user interface, exemplary means for calculating a vector difference between an adjustment start position and a current position of the user input where the calculated vector difference has a vector position and a vector length and the adjustment start position represents an initial position at which the user input begins, exemplary means for comparing the vector position to the rail data 334 and comparing the vector length to a threshold length where the rail data 334 describes a plurality of virtual rails, exemplary means for matching the user input to one of the plurality of virtual rails based on the comparisons, and exemplary means for providing notification to an application of the one of the plurality of virtual rails, wherein the application transitions from a first command to a second command corresponding to the one of the plurality of virtual rails without receiving an explicit termination gesture for the first command from the user 102.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system for transitioning from one gesture to another in a natural user interface without an explicit termination therebetween, said system comprising:

a memory area associated with a computing device, the memory area storing image data corresponding to user input received from a user via a natural user input interface, the memory area further storing rail data describing a first virtual rail and a second virtual rail; and a processor programmed to:

calculate a vector difference between an adjustment start position and a current position of the user input, the calculated vector difference having a vector position and a vector length, the adjustment start position representing an initial position at which the user input begins, the first virtual rail corresponding to the adjustment start position and a first command in an application, the second virtual rail corresponding to the current position and a second command in the application;

determine an angle of the vector relative to the first virtual rail;

compare the vector length to a threshold length and the angle of the vector to an angle threshold;

if the vector length and the angle of the vector indicate a transition from the first virtual rail to the second virtual rail, compare the vector length to a rail adjustment threshold;

based on the comparisons of the vector length to the threshold length, the angle of the vector to the angle threshold, and the vector length to the rail adjustment threshold, match the user input to the second virtual rail; and identify to the application the second virtual rail such that the application performs the second command.

2. The system of claim 1, wherein the processor is further programmed to determine the threshold length empirically.

3. The system of claim 1, wherein the processor is further programmed to determine the threshold length based on crowd-sourced data collected from a plurality of users.

4. The system of claim 1, wherein the processor is programmed to compare the vector length to the threshold length through determining whether the vector length is greater than the threshold length.

5. The system of claim 1, wherein the threshold length comprises a rail determination threshold length or a rail adjustment threshold length.

6. The system of claim 1, wherein said comparing the vector position comprises comparing the vector position to a cone threshold angle for the first virtual rail for transitioning from the first command to the second command.

7. A method comprising:

accessing, by a computing device, image data corresponding to user input received from a user via a natural user interface;

calculating a vector difference between an adjustment start position and a current position of the user input, the calculated vector difference having a vector position and a vector length, the adjustment start position representing an initial position at which the user input begins;

determining an angle of the vector relative to the first virtual rail;

comparing the vector position to rail data and the angle of the vector to an angle threshold, the rail data describing a first virtual rail and a second virtual rail, the first virtual rail corresponding to the adjustment start position and a first command in an application, the second virtual rail corresponding to the current position and a second command in the application;

if the vector position and the angle of the vector indicate a transition from the first virtual rail to the second virtual rail, compare the vector length to a rail adjustment threshold;

matching the user input to the second virtual rail based, at least in part, on the comparisons of the vector position, the angle of the vector, and the vector length; and providing notification to the application of the second virtual rail, wherein the application automatically transitions from the first command to the second command.

8. The method of claim 7, wherein matching the user input comprises switching from the first virtual rail to the second virtual rail.

9. The method of claim 7, wherein the first virtual rail corresponds to a rail along an X-axis and the second virtual rail corresponds to a rail along a Y-axis.

10. The method of claim 7, wherein said automatically transitioning from the first command to the second command comprises at least one of the following: transitioning from panning to zooming, from zooming to panning, from panning horizontally to panning vertically, or from panning vertically to panning horizontally.

11. The method of claim 7, wherein the rail threshold length comprises a rail determination threshold length or a rail adjustment threshold length.

12. The method of claim 7, wherein comparing the vector position comprises determining whether an angle of the current vector position with respect to the first virtual rail is within a cone angle threshold.

13. The method of claim 7, further comprising presenting an indication that the current position is closer to the second virtual rail than the first virtual rail.

14. The method of claim 7, further comprising:

calculating an apex angle of the vector based on the determined angle of the vector; and comparing the apex angle of the vector to a cone angle threshold associated with the vector, wherein said matching of the user input to the second virtual rail is based, at least in part, on the comparison of the apex angle to the cone angle threshold, and wherein the rail data comprises the cone angle threshold.

15. The method of claim 14, wherein the apex angle is calculated by doubling the angle of the vector.

16. One or more computer storage media embodying computer-executable components, said components comprising:

a user interface component executable to cause at least one processor to access image data corresponding to user input received from a user via a natural user interface;

a motion tracking component executable to cause at least one processor to calculate a vector difference between an adjustment start position and a current position of the user input, the calculated vector difference having a vector position a vector length, and an angle of the vector relative to a first virtual rail, the adjustment start position representing an initial position at which the user input begins;

a rail adjustment component executable to cause at least one processor to compare the vector position to rail data and compare the angle of the vector to an angle threshold, the rail data describing a first virtual rail and a second virtual rail, the first virtual rail corresponding to the adjustment start position and a first command in an application, the second virtual rail corresponding to the current position and a second command in the application, and if the vector position and the angle of the vector indicate a transition from the first virtual rail to the second virtual rail, compare the vector length to a rail adjustment threshold, wherein the rail adjustment component matches the user input to the second virtual rail based, at least in part, on the comparison of the vector position to the data, the angle of the vector to the angle threshold, and the vector length to the rail adjustment threshold; and a control component executable to cause at least one processor to identify, to the application, the second virtual rail, wherein the application automatically transitions from the first command to the second command.

17. The computer storage media of claim 16, wherein the application adjusts performance of the second command by adjusting a parameter value associated with the second command.

18. The computer storage media of claim 16, wherein the rail data includes a cone angle threshold for transitioning from the first command to the second command.

19. The computer storage media of claim 16, wherein matching the user input comprises switching from the first virtual rail to the second virtual rail.

20. The computer storage media of claim 16,
wherein the rail adjustment component causes said at least one processor to calculate an accuracy value based on the comparison of the angle of the vector to the angle threshold; and
wherein the control component causes said at least one processor to adjust performance of the second comment based on the accuracy value.

* * * * *